(12) United States Patent
Huang et al.

(10) Patent No.: US 12,038,879 B2
(45) Date of Patent: Jul. 16, 2024

(54) READ AND WRITE ACCESS TO DATA REPLICAS STORED IN MULTIPLE DATA CENTERS

(71) Applicant: HUAWEI CLOUD COMPUTING TECHNOLOGIES CO., LTD., Gui'an New District (CN)

(72) Inventors: Shuang Huang, Shenzhen (CN); Fucheng Hong, Shenzhen (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 61 days.

(21) Appl. No.: 17/526,659

(22) Filed: Nov. 15, 2021

(65) Prior Publication Data
US 2022/0075757 A1 Mar. 10, 2022

Related U.S. Application Data

(63) Continuation of application No. PCT/CN2020/096124, filed on Jun. 15, 2020.

(30) Foreign Application Priority Data

Sep. 27, 2019 (CN) .......................... 201910927180.0

(51) Int. Cl.
G06F 16/178 (2019.01)
G06F 16/18 (2019.01)
G06F 16/182 (2019.01)

(52) U.S. Cl.
CPC .......... G06F 16/178 (2019.01); G06F 16/183 (2019.01)

(58) Field of Classification Search
CPC .............................. G06F 16/178; G06F 16/183
See application file for complete search history.

(56) References Cited

U.S. PATENT DOCUMENTS 11,146,626 B2 * 10/2021 Sohail ................. H04L 67/1095
11,625,273 B1 * 4/2023 Elhemali ............... G06F 9/5016
718/104

(Continued)

FOREIGN PATENT DOCUMENTS

CN 103678360 A 3/2014
CN 104113597 A * 10/2014

(Continued)

OTHER PUBLICATIONS

Huang et al. authoring "Achieving Load Balance for Parallel Data Access on Distributed File Systems", IEEE, Mar. 2018. Download: https://ieeexplore.ieee.org/stamp/stamp.jsp?tp=&arnumber=8027054 (Year: 2018).*

(Continued)

Primary Examiner — Hares Jami
(74) Attorney, Agent, or Firm — Rimon PC

(57) ABSTRACT

This application provides a data read method. The data read method includes: A resource management server receives a data read request from a client. The data read request is used to request a plurality of files. The resource management server reads a replica of target data from a first data center. The target data includes data of different files among the plurality of files, the first data center is a data center with highest data locality among a plurality of data centers that store replicas of the target data, and data locality is used to indicate a degree of proximity between a replica of the target data stored in a data center and the target data. The resource management server sends, to the client, the replica of the target data read from the first data center.

6 Claims, 12 Drawing Sheets

(56) References Cited

U.S. PATENT DOCUMENTS

| | | | |
|---|---|---|---|
| 2005/0283649 A1 | 12/2005 | Turner et al. | |
| 2014/0059310 A1* | 2/2014 | Du | G06F 3/065 |
| | | | 711/162 |
| 2014/0122429 A1 | 5/2014 | Chen et al. | |
| 2014/0188825 A1* | 7/2014 | Muthukkaruppan | |
| | | | G06F 16/178 |
| | | | 707/694 |
| 2018/0018344 A1 | 1/2018 | Kilaru et al. | |
| 2018/0285263 A1 | 10/2018 | Ghazaleh | |

FOREIGN PATENT DOCUMENTS

| | | |
|---|---|---|
| CN | 104156381 A | 11/2014 |
| CN | 104615606 A | 5/2015 |
| CN | 105760391 A | 7/2016 |
| CN | 106095337 A | 11/2016 |
| CN | 109783002 A | 5/2019 |
| CN | 109901949 A | 6/2019 |
| CN | 110019082 A | 7/2019 |
| CN | 110022338 A | 7/2019 |
| CN | 110198346 A | 9/2019 |
| CN | 110825704 A | 2/2020 |

OTHER PUBLICATIONS

Mosharaf Chowdhury et al., "Leveraging Endpoint Flexibility in Data-Intensive Clusters", SIGCOMM'13, Aug. 12-16; pp. 231-242 (12 total pages).

Chenbo et al., "Design and Implement of Dynamic Replica Strategy Based on HDFS", Industrial Control Computer, 2015, with an English abstract, total 3 pages.

Li Qiang et al., "Data random access method oriented to HDFS", Computer Engineeringand Applications, 2017, 53 10 1-7., with an English abstract, total 7 pages.

Yue Hong-chao et al., "Design and Implementation of Remote Backup System based on HDFS", Computer Security, DOI 10.3969/j.issn.1671-0428.2013.07.002, 2013, with an English abstract, total 5 pages.

* cited by examiner

READ AND WRITE ACCESS TO DATA REPLICAS STORED IN MULTIPLE DATA CENTERS

CROSS-REFERENCE TO RELATED APPLICATIONS

This application is a continuation of International Patent Application No. PCT/CN2020/096124, filed on Jun. 15, 2020, which claims priority to Chinese Patent Application No. 201910927180.0, filed on Sep. 27, 2019. The disclosures of the aforementioned applications are hereby incorporated by reference in their entireties.

TECHNICAL FIELD

Embodiments of this application relate to the storage field, and in particular, to a data read method, a data write method, and a server.

BACKGROUND

Today, enterprise big data platforms carry an increasing amount of data and an increasing quantity of services, and scales of enterprise Hadoop clusters are increasing. Enterprises prefer to build the Hadoop clusters in a single-cluster mode. In addition, a plurality of data centers (DCs) may be deployed in a Hadoop cluster to carry large-scale data and services.

In an existing Hadoop cluster, all replicas of one piece of data are stored only in one DC. For example, all replicas of a file 1 are stored only in a DC 1, and all replicas of a file 2 are stored only in a DC 2. In addition, to ensure data locality and avoid cross-DC replica access, yet another resource negotiator (YARN) applications which distributes client data read requests only run in the same DC.

If a DC in a Hadoop cluster is faulty and a running YARN application in the DC is stopped, a request of a client cannot be responded. In addition, data in the DC cannot be read or written. After the DC fully recovers, most data is lost. Consequently, reliability cannot be ensured.

SUMMARY

Embodiments of this application provide a data read method, a data write method, and a server. After a single DC is faulty, data access to the DC by a client is not affected, and a request of the client can be responded.

To achieve the foregoing objective, the following technical solutions are used in the embodiments of this application.

According to a first aspect, a data read method is provided, including: A resource management server receives a data read request from a client. The data read request is used to request a plurality of files. The resource management server may further read a replica of target data from a first data center. The target data includes data of different files among the plurality of files. The first data center is a data center with the highest data locality among a plurality of data centers that store replicas of the target data, and data locality is used to indicate a degree of proximity between a replica of the target data stored in a data center and the target data. Finally, the resource management server sends, to the client, the replica of the target data read from the first data center.

In this embodiment of this application, replicas are not only stored in one DC, but are stored across DCs. Replicas of one piece of data may be stored in a plurality of DCs. In addition, based on actual distribution of replicas, the data read request of the client is always executed in the DC with the highest data locality. This prevents the client from occupying excessive bandwidth between DCs when reading and writing data across DCs. After a single DC is faulty, the client may further access the replica in another DC that stores the target data. This avoids that the request of the client cannot be responded.

With reference to the first aspect, in a first possible implementation of the first aspect, the data read request carries directory information of the target data, and the resource management server may determine, based on the directory information of the plurality of files, the plurality of data centers that store the replicas of the target data. Further, the resource management server calculates a degree of proximity between each of the replicas of the target data stored in the plurality of data centers and the target data, and determines that the data center whose stored replica of the target data is the closest to the target data is the first data center.

In this embodiment of this application, replicas are placed across DCs, and actual distribution of the replicas of the target data may be determined based on the directory information of the target data. Further, data locality of each DC for the target data may be calculated, so as to access the replica of the target data in the DC with the highest data locality, and access a replica that is closer to the target data in the same DC as much as possible. This prevents communication bandwidth between DCs from being excessively occupied to access the replica across DCs, thereby improving performance of an entire system.

With reference to the first aspect or the first possible implementation of the first aspect, in a second possible implementation of the first aspect, the method further includes: When the first data center is faulty, the resource management server reads a replica of the target data from a second data center. The second data center is the data center with the highest data locality in the plurality of data centers except the first data center. The resource management server sends, to the client, the replica of the target data read from the second data center.

In this embodiment of this application, after a single DC is faulty, a data center with the highest data locality in the remaining DCs that store a target replica may still be determined with reference to the actual distribution of the replicas, so that the replica that is closer to the target data in the data center can be accessed as much as possible. This prevents communication bandwidth between DCs from being excessively occupied to access the replica across DCs, thereby improving the performance of the entire system.

With reference to the first aspect or the first or the second possible implementation of the first aspect, in a third possible implementation of the first aspect, the replica of the target data is a replica stored in a data center in which the client is located.

In this embodiment of this application, when a replica is written across DCs, the replica is first written into a DC in which the client is located, so that traffic of an HDFS write operation can be reduced.

According to a second aspect, a data write method is provided, including: A name management server receives a data write request from a client. The data write request carries target data. The name management server may further write replicas of the target data into a plurality of data centers based on the target data.

In this embodiment of this application, replicas are not only stored in one DC, but are stored across DCs. Replicas of one piece of data may be stored in a plurality of DCs. Based on actual distribution of replicas, the data read requests of the client are always executed in a DC with the highest data locality. This prevents the client from occupying excessive bandwidth between DCs when reading and writing data across DCs. After a single DC is faulty, the client may further access the replica in another DC that stores the target data. This avoids that the request of the client cannot be responded.

With reference to the second aspect, in a first possible implementation of the second aspect, that the name management server writes replicas of the target data into a plurality of data centers based on the target data includes: The name management server writes a first replica of the target data into a data center in which the client is located.

In this embodiment of this application, when replicas are written across DCs, the first replica is first written into a DC in which the client is located, so that the traffic of an HDFS write operation can be reduced.

With reference to the second aspect or the first possible implementation of the second aspect, in a second possible implementation of the second aspect, the method further includes: When data centers in which the replicas of the target data are actually distributed are inconsistent with the plurality of data centers indicated by a block placement policy, the name management server adjusts the replicas of the target data to the plurality of data centers indicated by the block placement policy.

In this embodiment of this application, actual distribution of replicas is monitored, to ensure that the actual distribution of the replicas is consistent with the block placement policy.

During specific implementation, if a second data center in which the target replica is actually distributed does not belong to the plurality of data centers indicated by the block placement policy, the target replica in the second data center is deleted. If a third data center in the plurality of data centers indicated by the block placement policy does not include the replica of the target data, the target replica is written into the third data center.

This embodiment of this application further provides a specific method for monitoring replica distribution, to ensure that the actual distribution of the replicas is consistent with the block placement policy.

According to a third aspect, a resource management server is provided, including: a transceiver unit, configured to receive a data read request from a client, where the data read request is used to request a plurality of files; and a processing unit, configured to read a replica of target data from a first data center, where the target data includes data of different files in the plurality of files. The first data center is the data center with the highest data locality in a plurality of data centers that store replicas of the target data, and data locality is used to indicate a degree of proximity between a replica of the target data stored in a data center and the target data. The transceiver unit is further configured to send, to the client, the replica of the target data read from the first data center.

With reference to the third aspect, in a first possible implementation of the third aspect, the processing unit is further configured to: determine, based on directory information of the plurality of files, the plurality of data centers that store the replicas of the target data, the directory information of the target data that the data read request carries; and calculate a degree of proximity between each of the replicas of the target data stored in the plurality of data centers and the target data, and determine that the data center in which a stored replica of the target data is the closest to the target data is the first data center.

With reference to the third aspect or the first possible implementation of the third aspect, in a second possible implementation of the third aspect, the processing unit is further configured to: when the first data center is faulty, read a replica of the target data from a second data center. The second data center is the data center with the highest data locality in the plurality of data centers except the first data center. The transceiver unit is further configured to send, to the client, the replica of the target data read from the second data center.

With reference to the third aspect or the first or the second possible implementation of the third aspect, in a second possible implementation of the third aspect, the replica of the target data is a replica stored in the data center in which the client is located.

According to a fourth aspect, a name management server is provided, including: a transceiver unit, configured to receive a data write request from a client, where the data write request carries target data; and a processing unit, configured to write replicas of the target data into a plurality of data centers based on the target data.

With reference to the fourth aspect, in a first possible implementation of the fourth aspect, the processing unit is further configured to write a first replica of the target data into the data center in which the client is located.

With reference to the fourth aspect or the first possible implementation of the fourth aspect, in a second possible implementation of the fourth aspect, the processing unit is further configured to: when the data centers in which the replicas of the target data are actually distributed are inconsistent with a plurality of data centers indicated by a block placement policy, adjust the replicas of the target data to the plurality of data centers indicated by the block placement policy.

According to a fifth aspect, this application provides a resource management server. The resource management server includes a processor and a memory. The memory stores computer instructions. When the processor executes the computer instructions stored in the memory, the resource management server performs the method provided in the first aspect or the possible implementations of the first aspect.

According to a sixth aspect, this application provides a name management server. The name management server includes a processor and a memory. The memory stores computer instructions. When the processor executes the computer instructions stored in the memory, the name management server performs the method provided in the second aspect or the possible implementations of the second aspect.

According to a seventh aspect, this application provides a computer-readable storage medium. The computer-readable storage medium stores computer instructions, and the computer instructions instruct a resource management server to perform the method provided in the first aspect or the possible implementations of the first aspect.

According to an eighth aspect, this application provides a computer-readable storage medium. The computer-readable storage medium stores computer instructions, and the computer instructions instruct a name management server to perform the method provided in the second aspect or the possible implementations of the second aspect.

According to a ninth aspect, this application provides a computer program product. The computer program product includes computer instructions, and the computer instructions are stored in a computer-readable storage medium. A processor of a resource management server may read the computer instructions from the computer-readable storage medium. When the processor executes the computer instructions, the resource management server performs the method provided in the first aspect or the possible implementations of the first aspect.

According to a tenth aspect, this application provides a computer program product. The computer program product includes computer instructions, and the computer instructions are stored in a computer-readable storage medium. A processor of a name management server may read the computer instructions from the computer-readable storage medium. When the processor executes the computer instructions, the name management server performs the method provided in the second aspect or the possible implementations of the second aspect.

DESCRIPTION OF EMBODIMENTS

The following describes technical solutions of this application with reference to the accompanying drawings.

First, terms used in embodiments of this application are explained and described.

(1) Hadoop Distributed File System (HDFS)

Figure 1:
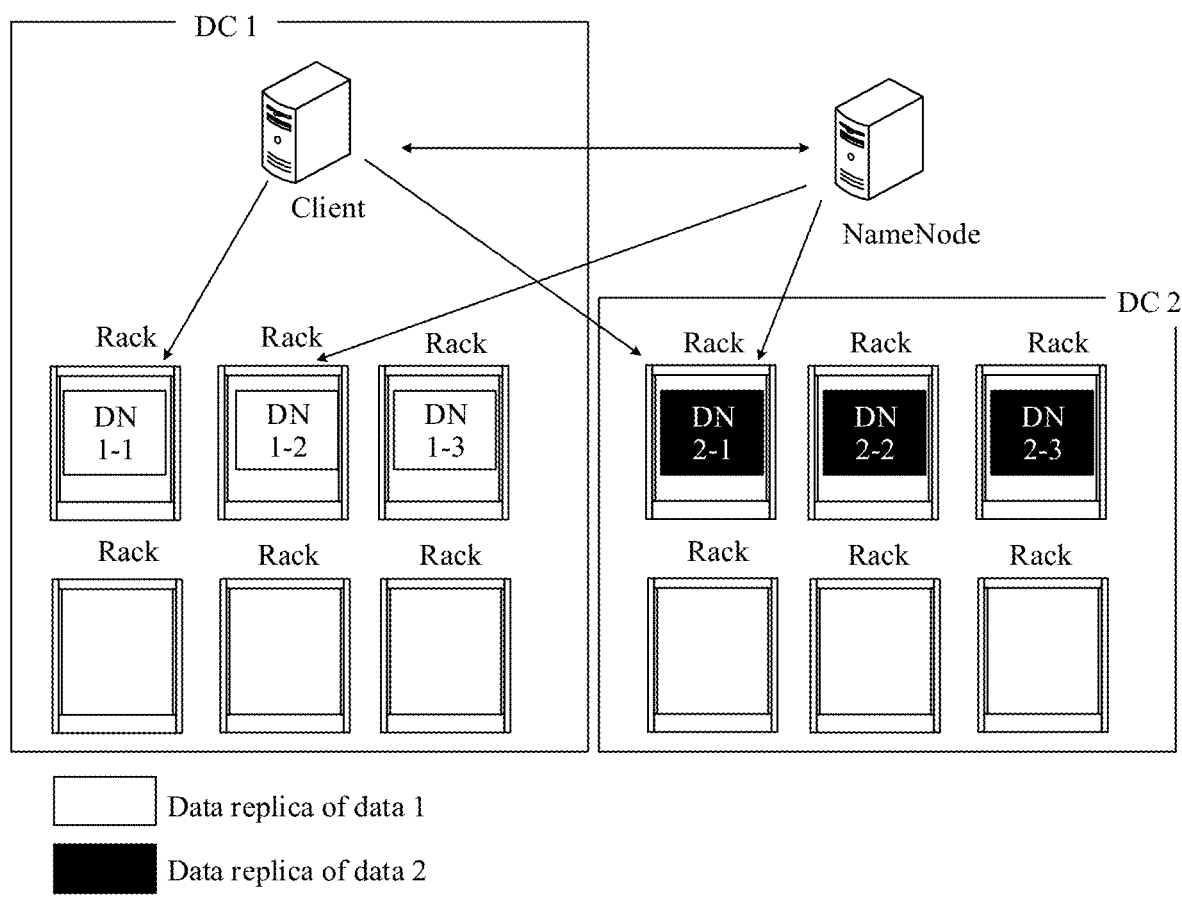
FIG. 1 is an architectural diagram of an HDFS in the conventional technology.

The HDFS is a Hadoop file system that is used to store massive data and features high fault tolerance and high throughput. Refer to FIG. 1. The HDFS includes a YARN ResourceManager, an HDFS client, a NameNode, and a plurality of DataNodes (DNs). One rack in the HDFS includes a plurality of DataNodes, and a plurality of racks form a data center (DC). When the HDFS client writes a file, the file may be divided into a plurality of data blocks, a plurality of replicas may be stored for each data block, and different replicas are stored on different DataNodes.

The YARN ResourceManager is used to manage a YARN, and the YARN ResourceManager may be used to manage data in the Hadoop in a centralized manner. For example, the YARN ResourceManager receives a read/write request from a client, and allocates a MapReduce task to the request. For example, a YARN application reads data on a DataNode 1 and a DataNode 2. The YARN is a resource scheduling framework of the Hadoop, and can allocate computing resources for computing engine running.

The client is used by a user to create, access, and modify a file.

The NameNode is responsible for managing a NameSpace (NameSpace) of a file and stores metadata of the file. The metadata may be a file name of the file, a directory of the file, a block list of the file, DataNode information corresponding to a block, and the like. It should be noted that the directory of the file is a path for accessing the file, the block list of the file indicates data blocks included in the file, and the DataNode information corresponding to the block is used to indicate a DataNode on which the data block is stored.

The DataNode is used to store data, and receive a data read request (which may also be referred to as a data read/write request) of the client.

In addition, a cross-DC cluster includes a plurality of DCs, and can store massive data. For example, the Hadoop shown in FIG. 1 is a cross-DC cluster Hadoop, that is, DataNodes of the Hadoop are distributed in three or more data centers. The DC refers to a physical space in which data information is processed, stored, transmitted, exchanged, and managed in a centralized manner. A computer, a server, a network device, a communications device, a data center, and the like are key devices of the data center.

(2) MapReduce

The MapReduce is a computing framework (computing engine) of the Hadoop, and allocates an application to the data read request submitted by the client. The MapReduce allows the application to run on the YARN, to execute an HDFS read/write request from the HDFS client.

The MapReduce is a computing engine. The client submits a data read request. After a MapReduce task is allocated to the data read request of the client, the YARN may allocate a computing resource to the MapReduce task.

(3) Block Placement Policy (BPP)

When the HDFS stores data, a rule for placing a replica is called a BPP. In the conventional technology, all replicas of a same data block are placed in a same DC. Therefore, an existing BPP may be a placement rule of replicas in one DC, for example, a placement rule of replicas on different racks in a same DC.

In this embodiment of this application, replicas of a same data block may be placed across DCs, and the BPP may indicate placement rules of the replicas in different data centers (data centers, DCs).

For example, different replicas of a same data block may be placed on different racks in a DC cluster, to avoid that all replicas are lost when a rack is faulty. This improves system reliability.

(4) Data Locality (DL)

To minimize bandwidth consumption and latency for the client to read data in the Hadoop, a replica closest to a node on which the client is located is selected as much as possible. The data locality may indicate a "close" degree between HDFS data and a MapReduce task that processes the data. Higher data locality represents a closer distance between a DataNode on which the replica is located and the client. Reading a replica on a node with high data locality may reduce bandwidth consumption and latency for data read.

For example, a file requested by the client includes a data block 1, a data block 2, and a data block 3. A YARN application 1 is used to access a DC 1, and the DC 1 includes a replica of the data block 1. A YARN application 2 is used to access a DC 2, and the DC 2 includes the replica of the data block 1, a replica of the data block 2, and a replica of the data block 3. A YARN application 3 is used to access a DC 3, and the DC 3 includes the replica of the data block 2 and the replica of the data block 3. It can be learned that an entire file can be accessed through the YARN application 2, a replica does not need to be accessed across DCs by using traffic, and the DC 2 has highest data locality.

(5) Recovery Point Object (RPO)

After a disaster occurs, assuming that a system (for example, HDFS) recovers data at the first moment before the disaster occurs, the RPO is duration from the first moment to a moment at which the disaster occurs.

(6) Recovery Time Object (RTO)

The RTO refers to duration from a moment when services are interrupted because a system (for example, HDFS) breaks down to a moment when the system is recovered and the services are restored after a disaster occurs.

FIG. 1 is an architectural diagram of a system of an existing Hadoop. As shown in FIG. 1, in the existing HDFS, all replicas of a piece of data are stored only in one DC. For example, all replicas of a file 1 (three replicas: a DN 1-1, a DN 1-2, a DN 1-3) are all stored in a DC 1, and all replicas of a file 2 (three replicas: a DN 2-1, a DN 2-2, a DN 2-3) are all stored in a DC 2.

In addition, the YARN ResourceManager receives the data read request from the client, and a YARN application allocated to the data read request runs only in a same DC. This ensures data locality and avoids cross-DC access to a replica.

However, in the existing HDFS system, after a DC is faulty, an application running in the DC is stopped, that is, the RTO is greater than 0. In addition, data in the DC cannot be read or written. After the DC fully recovers, most data is lost, that is, the RPO is greater than 0. It can be learned that reliability of the HDFS cannot be ensured in the conventional technology.

Figure 2:
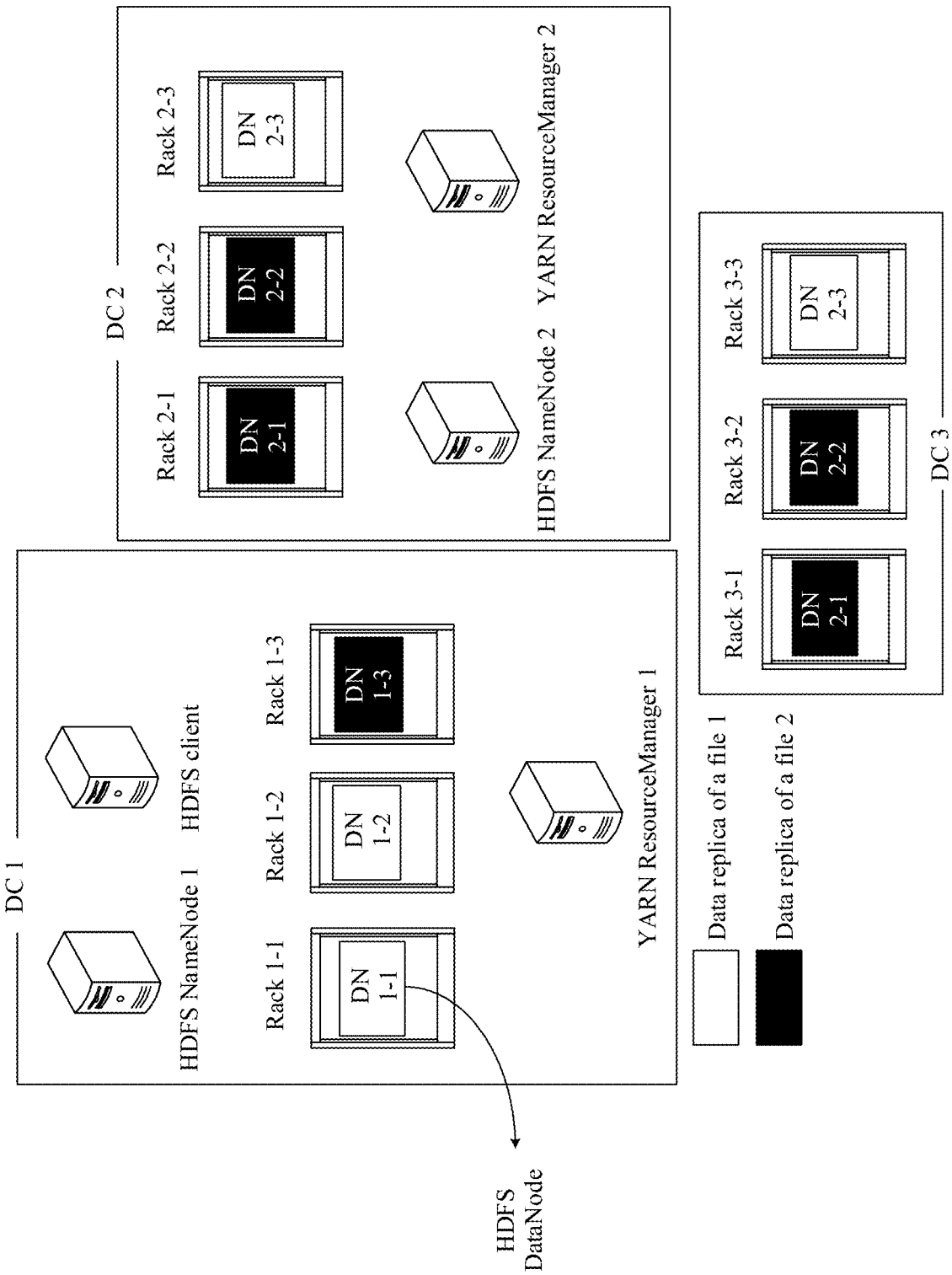
FIG. 2 is an architectural diagram of a data storage system according to an embodiment of this application.

FIG. 2 is an architectural diagram of a data storage system according to an embodiment of this application. The data storage system includes an HDFS client, a resource management server (namely, YARN ResourceManager, YARN ResourceManager), an HDFS NameNode, an HDFS DataNode, and at least three DCs. In FIG. 2, only three DCs, a DC 1, a DC 2, and a DC 3, are used as an example. It should be noted that the HDFS client exists in a DC in the data storage system, for example, the DC 2 shown in FIG. 2. In addition, HDFS NameNodes are deployed across DCs. For example, in FIG. 2, HDFS NameNodes of the DC 1 are an HDFS NameNode 1 and an HDFS NameNode 2, the HDFS NameNode 1 and the HDFS NameNode 2 are respectively deployed in the DC 1 and the DC 2, and the HDFS NameNode 1 and the HDFS NameNode 2 can manage a NameSpace of the DC 1. The HDFS NameNode 1 is an active NameNode, and correspondingly, the HDFS NameNode 2 is a standby NameNode. Resource management servers are deployed across DCs. For example, in FIG. 2, YARN ResourceManagers of the DC 1 are a YARN ResourceManager 1 and a YARN ResourceManager 2, the YARN ResourceManager 1 and the YARN ResourceManager 2 are respectively deployed in the DC 1 and the DC 2, and the YARN ResourceManager 1 and the YARN ResourceManager 2 can manage resources in the DC 1.

Although not shown in FIG. 2, it may be understood that HDFS NameNodes of the DC 2 and the DC 3 may also be deployed across DCs. For example, HDFS NameNodes of the DC 2 are an HDFS NameNode 3 and an HDFS NameNode 4, and are respectively deployed in the DC 2 and the DC 3. The HDFS NameNode 3 and the HDFS NameNode 4 can manage a NameSpace of the DC 2. HDFS NameNodes of the DC 3 are an HDFS NameNode 5 and an HDFS NameNode 6, and are respectively deployed in the DC 3 and the DC 1. The HDFS NameNode 5 and the HDFS NameNode 6 can manage a NameSpace of the DC 3.

Similarly, YARN ResourceManagers of the DC 2 and the DC 3 may also be deployed across DCs. In addition, ZooKeeper (open source distributed application coordination service) and JournalNode are deployed across three DCs. If a single DC is faulty, ZooKeeper and JournalNode in other DCs can work properly, so that data access is not affected.

One DC may include a plurality of DataNodes. Refer to FIG. 2. The DC 1 includes a plurality of DataNodes such as a DN 1-1, a DN 1-2, and a DN 1-3. The DC 2 includes a plurality of DataNodes such as a DN 2-1, a DN 2-2, and a DN 2-3. The DC 3 includes a plurality of DataNodes such as a DN 3-1, a DN 3-2, and a DN 3-3. In addition, replicas of a same data block are stored across DCs. For example, in FIG. 2, replicas of a file 1 are stored in the DC 1 and the DC 2, and replicas of a file 2 are stored in the DC 1 and the DC 2. When a DC is faulty, a replica of the data block can be accessed from another DC, to ensure that the client can properly read, write, and access.

The resource management server may be the YARN ResourceManager in this embodiment of this application, and is configured to: receive the data read request of the client, calculate, based on the data read request of the client and actual distribution of replicas of a file requested by the client, a DC with the highest data locality, and allocate an application to execute the data read request of the client in the DC. When the DC is faulty, the resource management server recalculates another DC with the highest data locality, and migrates the application to the re-determined DC to execute the data read request of the client.

It should be noted that when replicas are stored across DCs, the client may need to use bandwidth between DCs to read or write data on DataNodes in different DCs. However, communication bandwidth between different DCs is usually limited. When the client uses the communication bandwidth between DCs to read or write data across DCs, proper communication between DCs is greatly affected and performance of the entire data storage system is affected. For example, as shown in FIG. 2, the client is in the DC 2. Assuming that a replica requested by the client to access is stored in a DataNode DN 1-3, the client needs to use communication bandwidth between the DC 2 and the DC 1, and read the replica from the DN 1-3 in the DC 1.

In this embodiment of this application, a replica is not only stored in one DC, but is stored across DCs. A replica of one piece of data may be stored in a plurality of DCs. In addition, based on actual distribution of replicas, a data read request of the client are always executed in the DC with the highest data locality. This prevents the client from occupying excessive bandwidth between DCs when reading and writing data across DCs. After a single DC is faulty, the client may further access the replica in another DC that stores the target data. This avoids that the request of the client cannot be responded.

Figure 3:
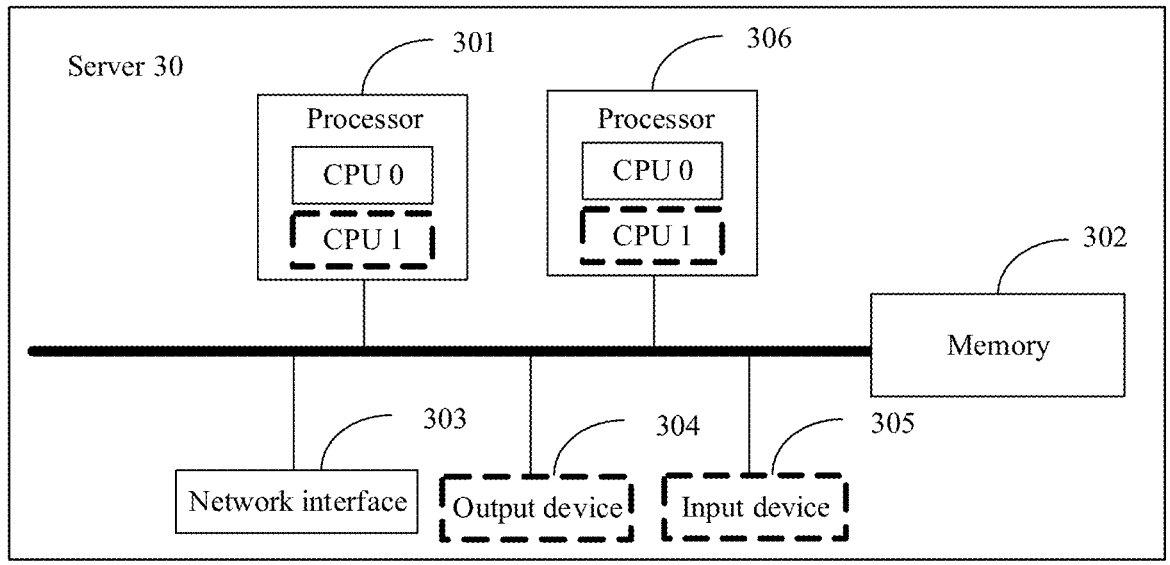
FIG. 3 is a block diagram of a structure of a server according to an embodiment of this application.

FIG. 3 is a schematic diagram of a hardware structure of a server 30 according to an embodiment of this application.

The server 30 may be the resource management server or the name management server described in the embodiments of this application. Refer to FIG. 3. The server 30 includes a processor 301, a memory 302, and at least one network interface (in FIG. 3, only an example in which a network interface 303 is included is used for description). The processor 301, the memory 302, and the network interface 303 are connected to each other.

The processor 301 may be a general-purpose central processing unit (CPU), a microprocessor, an application-specific integrated circuit (ASIC), or one or more integrated circuits configured to control program execution of the solutions in this application.

The network interface 303 is an interface of the server 30, and is configured to communicate with another device or a communications network such as the Ethernet, a radio access network (RAN), or a wireless local area network (WLAN).

The memory 302 may be a read-only memory (ROM) or another type of static data center that can store static information and instructions, or a random access memory (RAM) or another type of dynamic data center that can store information and instructions, or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic data center, or any other medium that can be used to carry or store expected program code in a form of instructions or a data structure and that is accessible by a computer. This is not limited thereto. The memory may exist independently, and be connected to the processor through a communication line 302. The memory may alternatively be integrated with the processor.

The memory 302 is configured to store computer-executable instructions for executing the solutions of this application, and the processor 301 controls the execution. The processor 301 is configured to execute the computer-executable instructions stored in the memory 302, to implement the intent processing method provided in the following embodiments of this application.

Optionally, the computer-executable instructions in this embodiment of this application may also be referred to as application program code. This is not specifically limited in this embodiment of this application.

During specific implementation, in an embodiment, the processor 301 may include one or more CPUs, for example, a CPU 0 and a CPU 1 in FIG. 3.

During specific implementation, in an embodiment, the server 30 may include a plurality of processors such as the processor 301 and a processor 306 in FIG. 3. Each of the processors may be a single-core (single-CPU) processor or a multi-core (multi-CPU) processor. The processor herein may refer to one or more devices, circuits, and/or processing cores configured to process data (for example, computer program instructions).

During specific implementation, in an embodiment, the server 30 may further include an output device 304 and an input device 305. The output device 304 communicates with the processor 301, and may display information in a plurality of manners. For example, the output device 304 may be a liquid crystal display (LCD), a light emitting diode (LED) display device, a cathode ray tube (CRT) display device, a projector, or the like. The input device 305 communicates with the processor 301, and may receive an input of a user in a plurality of manners. For example, the input device 305 may be a mouse, a keyboard, a touchscreen device, or a sensing device.

The server 30 may be a general-purpose device or a special-purpose device. During specific implementation, the server 30 may be a desktop computer, a network server, an embedded device, or another device having a structure similar to that in FIG. 3. A type of the server 30 is not limited in this embodiment of this application.

Figure 4:
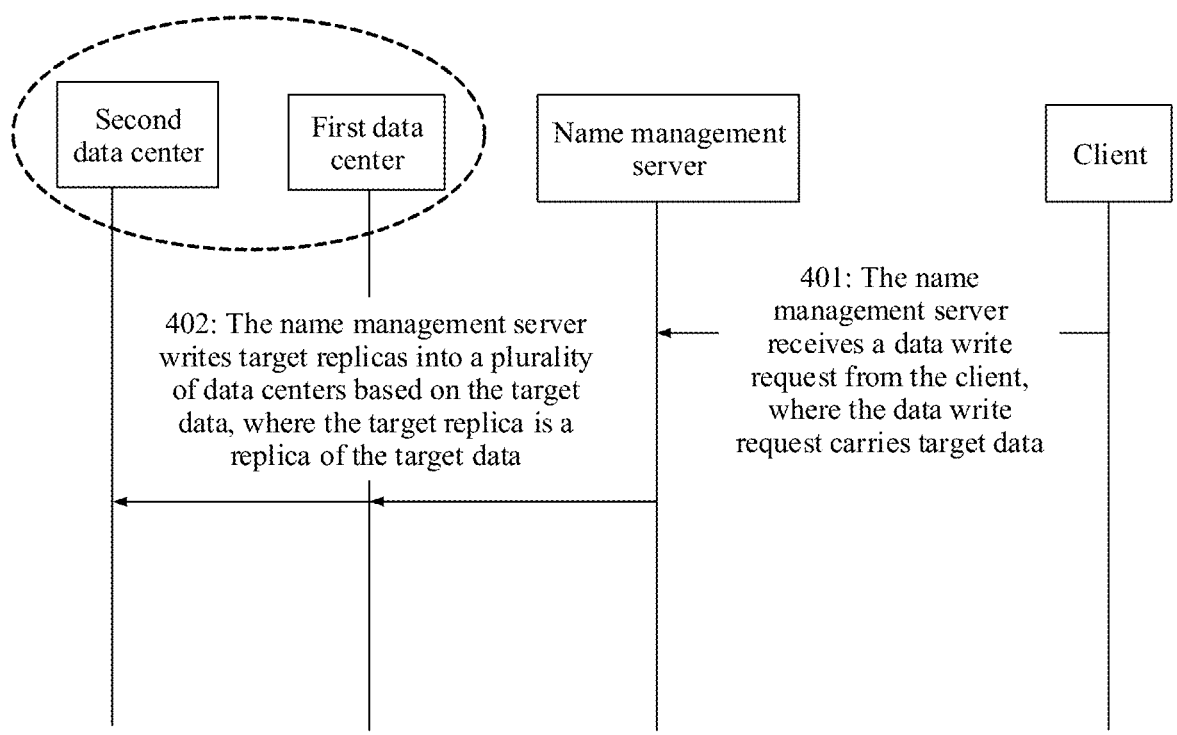
FIG. 4 is a schematic flowchart of a data write method according to an embodiment of this application.

An embodiment of this application provides a data write method. As shown in FIG. 4, the method includes step 401 and step 402.

Step 401: A name management server receives a data write request from a client, where the data write request carries target data.

It should be noted that the name management server in this embodiment of this application may be the HDFS NameNode shown in FIG. 2.

Step 402: The name management server writes target replicas into a plurality of data centers based on the target data, where the target replica is a replica of the target data.

It should be noted that, to reduce traffic of an HDFS write operation, a replica is first written into a data center in which the client is located. For example, a first target replica is written into a first data center, and the first data center is the data center in which the client is located.

During specific implementation, a block placement policy (BPP) for storing replicas across DCs is preset, and the name management server may write the replicas across DCs according to the BPP, and first write the replica into a DC in which the HDFS client is located. In other words, the first replica is stored in the DC in which the HDFS client is located. Then, other replicas are written into DataNodes in different DCs in sequence. It may be understood that the replica is first written into the DC in which the HDFS client is located, so that traffic used by the client to write data is reduced, and performance of the HDFS write operation is improved.

Figure 5:
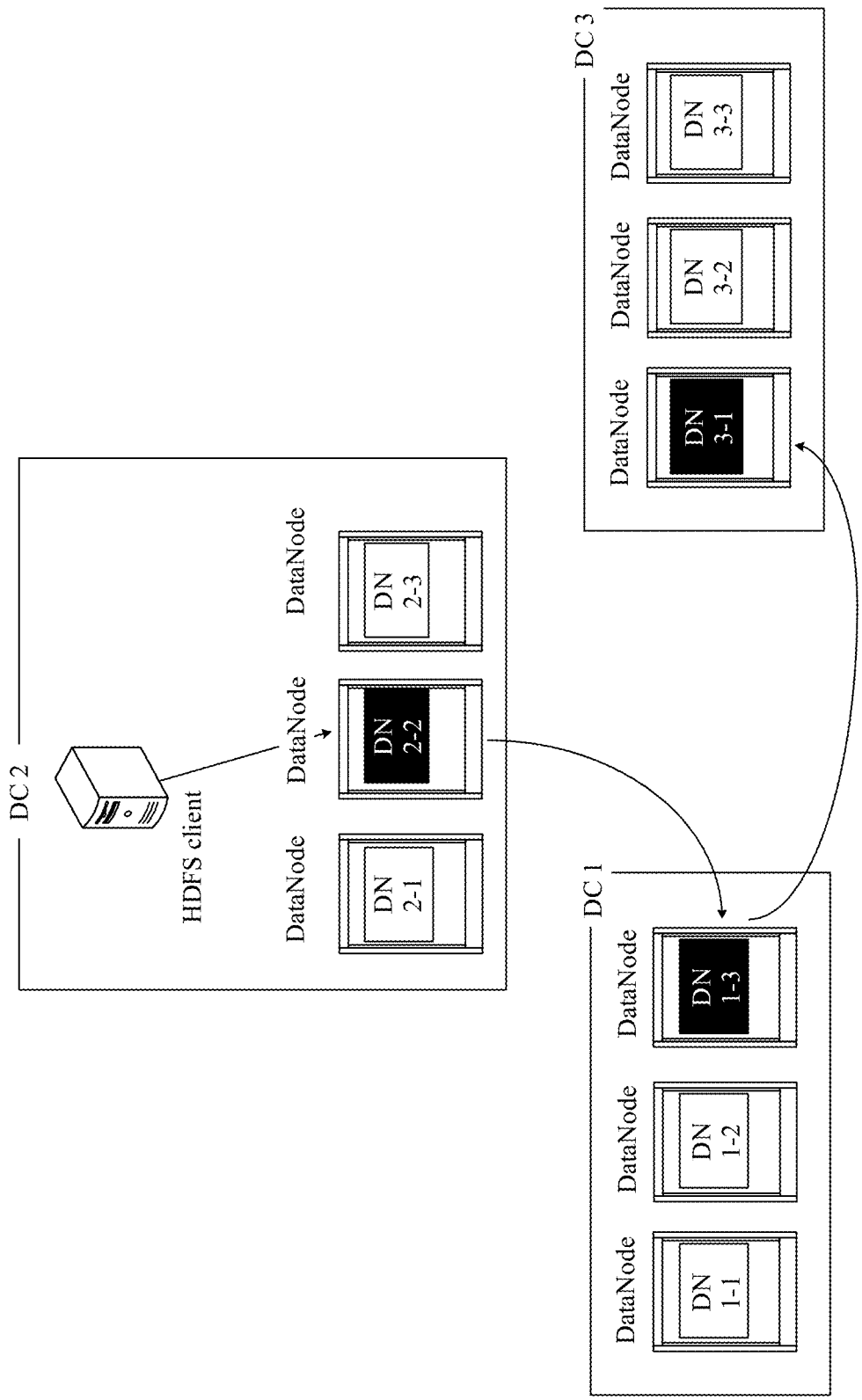
FIG. 5 is a schematic diagram of replica writing according to an embodiment of this application.

For example, refer to FIG. 5. The BPP indicates to write replicas of the same data block into a DC 1, a DC 2, and a DC 3. When a NameNode writes the replicas according to the BPP, the NameNode first writes the replica into the DC 2 in which the HDFS client is located, for example, writes the replica into a DN 2-2 in the DC 2, then copies the replica in the DN 2-2 and writes the replica into a DN 1-3 in the DC 1, and finally copies the replica in the DN 1-3 and writes the replica into a DN 3-1 in the DC 3.

Figure 6:
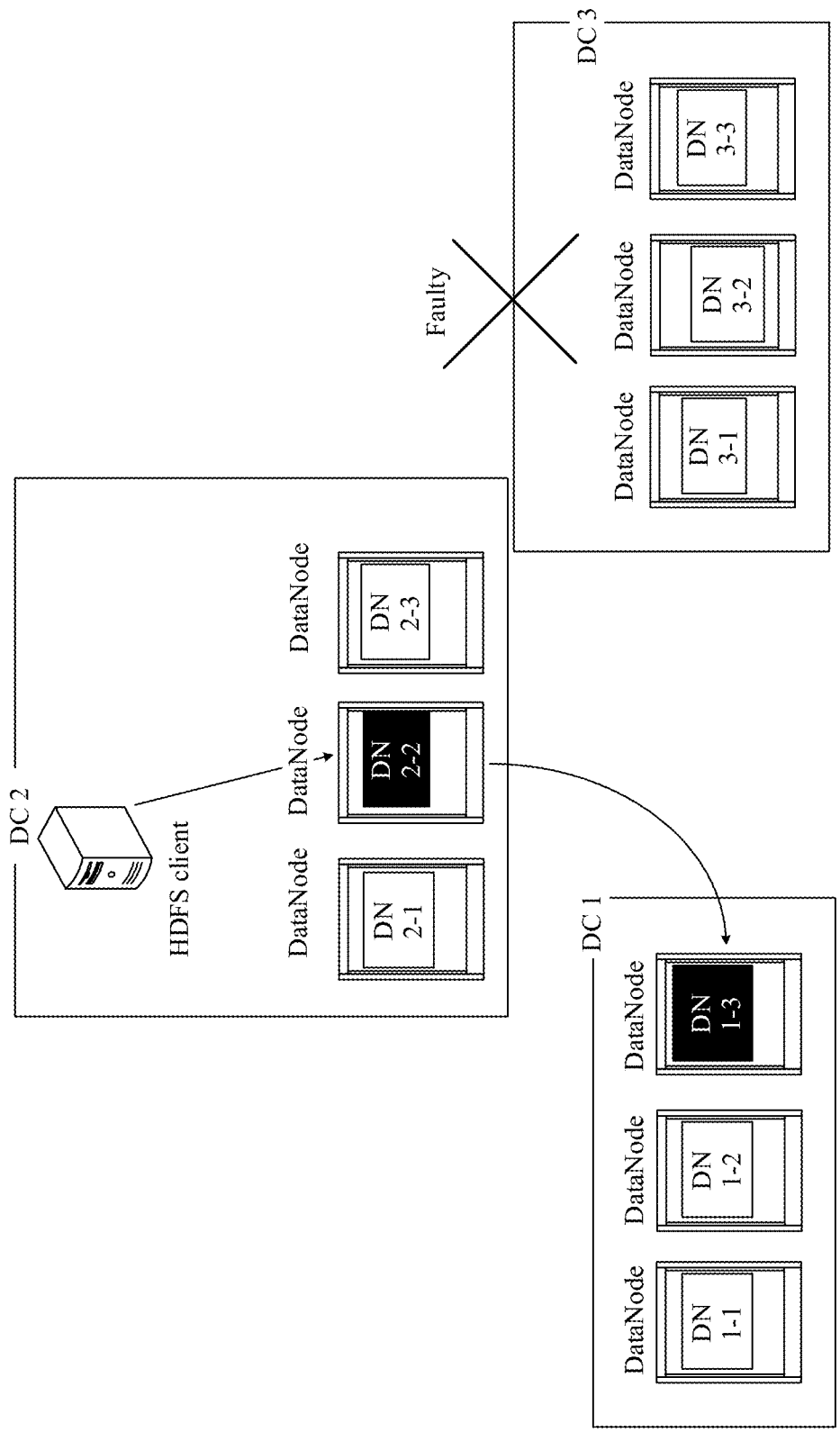
FIG. 6 is another schematic diagram of replica writing according to an embodiment of this application.

It should be noted that, when writing the replica according to the BPP, if the NameNode finds that a DC into which the replica should be written is faulty, the NameNode may ignore the DC when writing the replica, and write the replica only into another valid DC indicated by the BPP. For example, refer to FIG. 6. According to a preset BPP, a replica needs to be written into the DC 3, but because the DC 3 is faulty, the NameNode ignores the DC 3 when writing the replica, and writes the replica only into the DC 1 and the DC 2 that are indicated by the BPP.

In addition, the block placement policy is a directory-level policy. For example, if a block placement policy is set for a same HDFS directory, all files in the directory follow the policy to write replicas. After writing a file according to the block placement policy, the NameNode records, by using metadata of the file, actual distribution of replicas of all data blocks included in the file. The metadata of the file may include a block list of the file and DataNode information corresponding to the block.

Optionally, the method shown in FIG. 4 further includes: determining whether data centers in which the target replicas are actually distributed are consistent with the plurality of data centers indicated by the block placement policy; and when the data centers in which the target replicas are actually distributed are inconsistent with the plurality of data centers indicated by the block placement policy, adjusting the replicas of the target data to the plurality of data centers indicated by the block placement policy.

Specifically, the adjusting the actual distribution of the target replicas according to the block placement policy includes:

if a second data center in which the target replica is actually distributed does not belong to the plurality of data centers, deleting the target replica in the second data center, that is, the replica cannot be placed in a data center that is not indicated by the block placement policy, and the actual distribution of the replica of the target data needs to be consistent with the data center indicated by the block placement policy; and if a third data center in the plurality of data centers does not include the replica of the target data, writing the target replica into the third data center, that is, if a data center indicated by the block placement policy does not store a replica, a replica needs to be copied in another data center to store the replica in the data center, and the actual distribution of the replica of the target data needs to be consistent with the data center indicated by the block placement policy.

In this embodiment of this application, the NameNode may further check whether the DC in which the replica is actually distributed is consistent with the DC indicated by the BPP. If the actual distribution of the replica is inconsistent with that in the BPP, the NameNode adjusts the replica in each DC, including copying the replica or deleting the replica, to ensure that the DC in which the replica is actually distributed is consistent with that in the BPP.

Figure 7:
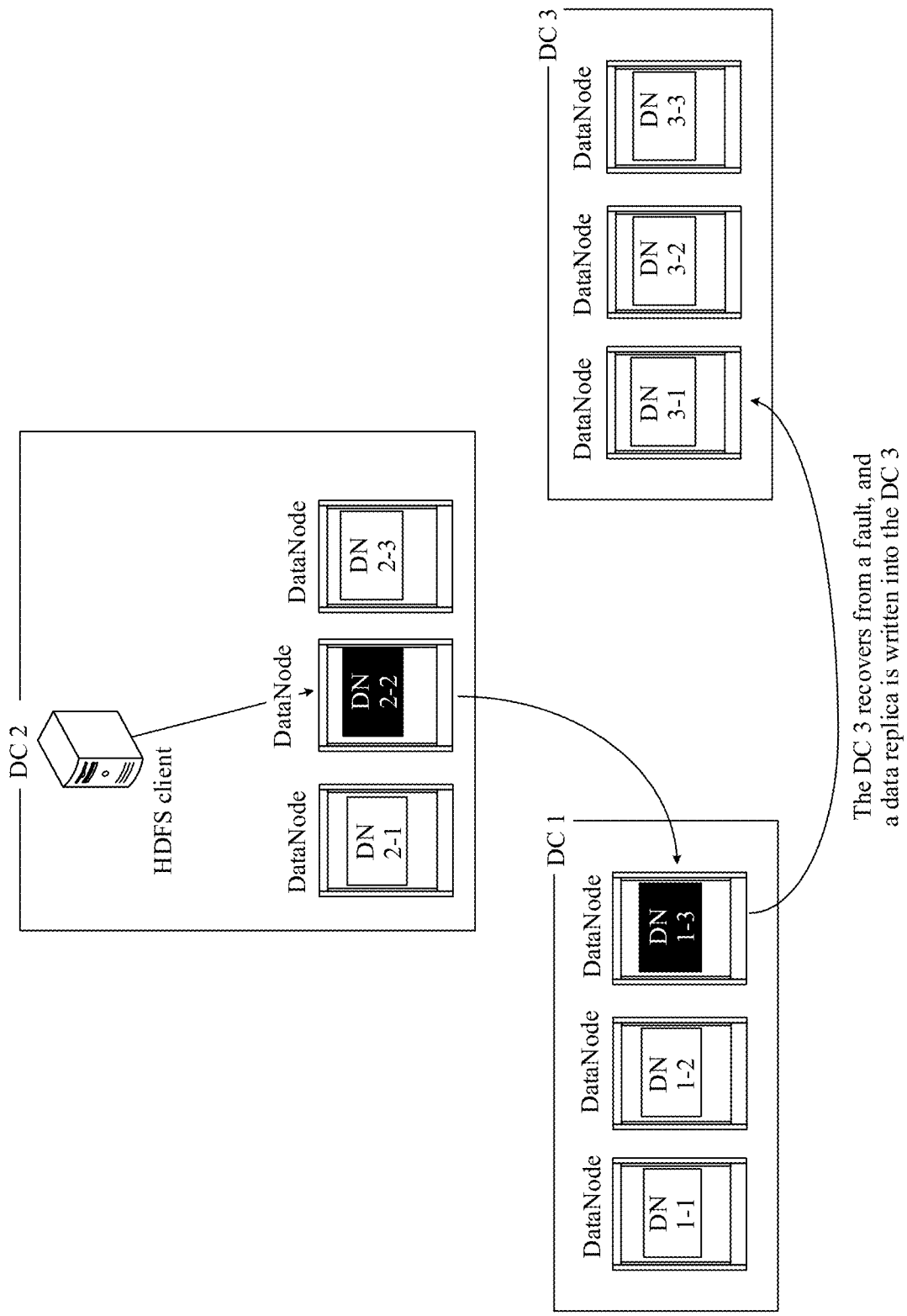
FIG. 7 is a schematic diagram of replica monitoring according to an embodiment of this application.

For example, refer to FIG. 7. The BPP indicates that replicas of a file 1 are stored in a DC 1, a DC 2, and a DC 3, that is, a replica of each data block of the file 1 is stored in the DC 1, the DC 2, and the DC 3. After the DC 3 recovers from a fault, the NameNode detects that the DC 3 lacks a replica, and may copy the replica in another DC to the DC 3, for example, copy the replica of the data block stored in the DC 1 or the DC 2 to the DC 3.

Figure 8:
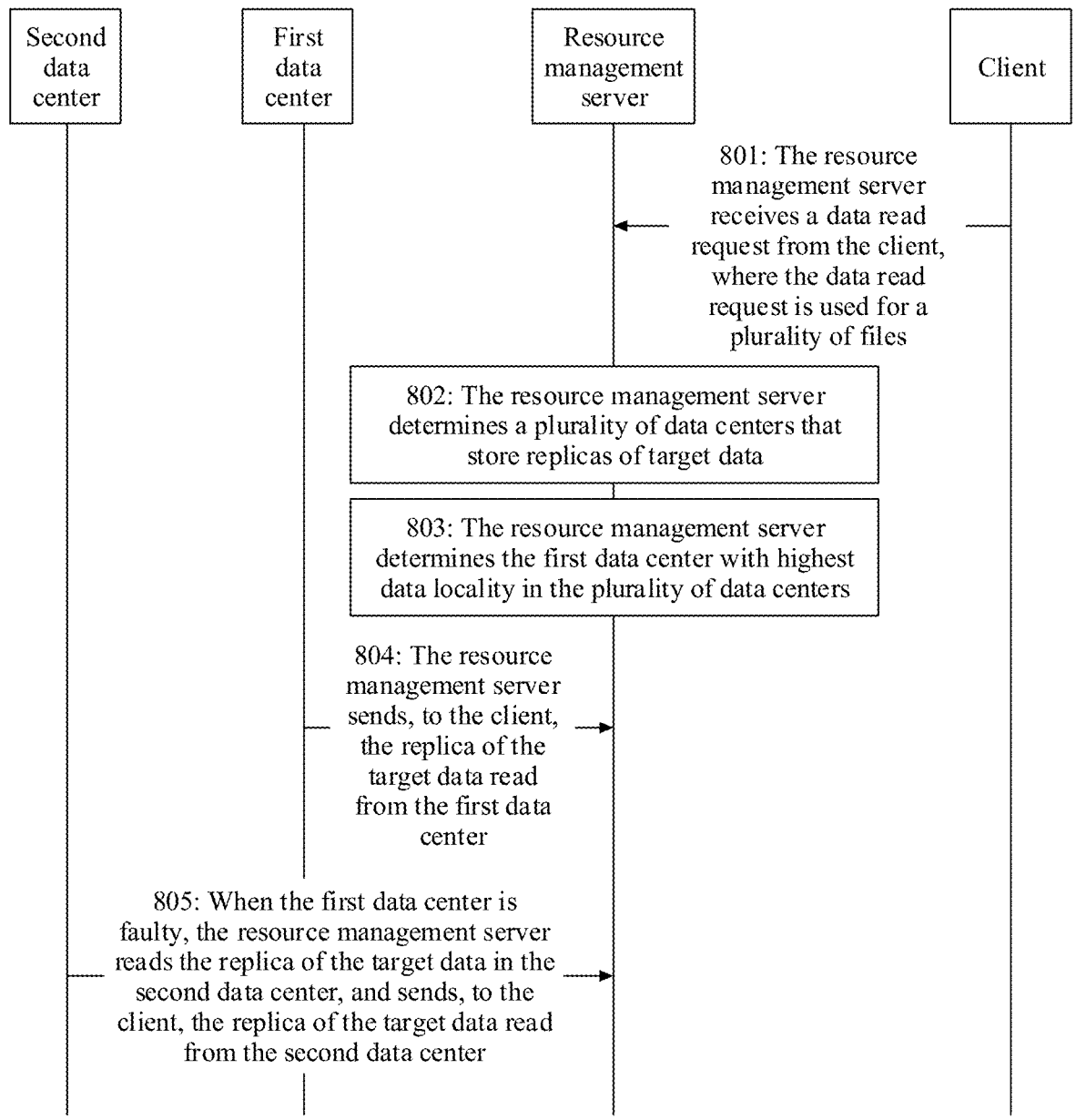
FIG. 8 is a schematic flowchart of a data read method according to an embodiment of this application.

Data access provided in an embodiment of this application is applicable to the data storage system shown in FIG. 2. As shown in FIG. 8, the method includes the following steps.

Step 801: A resource management server receives a data read request from a client, where the data read request is used for a plurality of files.

It should be noted that the resource management server is configured to perform resource management on the data storage system, including allocating an application to the data read request of the client. For example, the resource management server may be the YARN ResourceManager described in the embodiments of this application.

During specific implementation, in response to an operation performed by a user on the client, the client runs an application to request to access a plurality of files, and data of different files among the plurality of files that the client requests to access may be referred to as target data. For example, the client requests to access M files, the target data may be data of N different files among the M files, and N is a positive integer less than or equal to M. It should be further noted that when the client writes a file, the client writes replicas of the file across DCs. Therefore, replicas of the plurality of files that the client requests to access may be stored in a plurality of different DCs.

In a possible implementation, the plurality of files requested by the client are from different directories. For example, the plurality of files that the client requests to access are a target file 1 and a target file 2. A directory of the target file 1 is "Desktop/This PC/E:/Folder 1/Target File 1", and a directory of the target file 2 is "This PC/D:/Folder 2/Target File 2". It may be understood that the target data may be data of the target file 1 and the target file 2.

During specific implementation, the client may send the data read request to the resource management server, and the resource management server allocates a corresponding YARN application to execute the data read request, so that the client reads the data of the target file 1 and the target file 2.

In addition, the data read request may include directory information of the target data. The directory information of the target data is used to indicate access paths of the plurality of files that the client requests to access. For example, an application triggered by the user on the client requests to access the data of the target file 1 and the target file 2. The client submits the data read request to the resource management server. The data read request carries directory information of the target file 1 and the target file 2. For example, the directory information carried in the data read request is "Desktop/This PC/E:/Folder 1/Target File 1" and "This PC/D:/Folder 2/Target File 2".

Step 802: The resource management server determines a plurality of data centers that store replicas of the target data.

It should be noted that the replicas of the target data are the replicas of the plurality of files that the client requests to access. For example, the client requests to access the data of the target file 1 and the target file 2, and the replicas of the target data may be a replica of the target file 1 and a replica of the target file 2.

In addition, in this embodiment of this application, replicas of the file are placed across DCs. Therefore, the replicas of the file are stored in at least two different data centers. In addition, a block placement policy corresponding to the file determines a DC in which the replica of the file is actually distributed. If block placement policies of the plurality of files requested by the client are the same, DCs in which the replicas of the plurality of files are actually distributed may be the same. If block placement policies of the plurality of files requested by the client are different, DCs in which the replicas of the plurality of files are actually distributed may be different.

In this embodiment of this application, the block placement policy is at a directory level, and block placement policies of files in a same directory are the same. That is, when the plurality of files requested by the client to access do not belong to a same directory, in other words, the plurality of files are from different directories, block placement policies corresponding to the plurality of files are different. For example, if the client requests to access the target file 1 and the target file 2, and the target file 1 and the target file 2 are from different directories, a block placement policy corresponding to the target file 1 is as follows: replicas are placed in a DC 1, a DC 2, and a DC 3, that is, replicas of all data blocks of the target file 1 need to be placed in the DC 1, the DC 2, and the DC 3, and a block placement policy corresponding to the target file 2 is as follows: replicas are placed in the DC 2 and the DC 3, that is, replicas of all data blocks of the target file 2 need to be placed in the DC 2 and the DC 3.

When the plurality of files requested by the client to access belong to a same directory, block placement policies corresponding to the plurality of files are the same. For example, the client requests to access the target file 1 and the target file 2, and a block placement policy corresponding to the target file 1 is as follows: replicas are placed in the DC 1, the DC 2, and the DC 3, that is, replicas of all data blocks of the target file 1 need to be placed in the DC 1, the DC 2, and the DC 3, and a block placement policy corresponding to the target file 2 is also as follows: replicas are placed in the DC 1, the DC 2, and the DC 3, that is, replicas of all data blocks of the target file 2 need to be placed in the DC 1, the DC 2, and the DC 3.

During specific implementation, data centers corresponding to the plurality of target files that the client requests to access may be determined based on the directory information in the data read request, that is, data centers corresponding to the target data requested by the client, and these data centers store the replicas of the target data.

In a possible implementation, metadata of the file records the DC in which the replica of the file is actually distributed. A data center that stores the replica of the file may be determined by querying the metadata of the file. For example, the plurality of files requested by the client may be determined based on the directory information carried in the data read request. Further, metadata of the plurality of files may be queried, to determine data centers that store the replicas of the data (that is, target data) of the plurality of files, that is, the DCs in which the replicas of the target data are actually distributed.

In a possible implementation, a block list of the file and DataNode information corresponding to a block are queried, to determine a data block included in the file requested by the client and a DataNode on which each data block is located. Based on a DataNode on which the data block is located, a to-be accessed data center is selected. The to-be accessed data center is a data center in which a replica of the data of the file is stored.

For example, the resource management server queries metadata of the target file 1, and may determine a plurality of data centers that store replicas of the target file 1. For example, a block list of the target file 1 includes a data block 1a, a data block 1b, and a data block 1c. Data node information corresponding to the data block 1a is "a DN 1-1 and a DN 2-1", that is, the data block 1a has two replicas, and the two replicas are stored on the DataNode DN 1-1 in the DC 1 and the DataNode DN 2-1 in the DC 2 in a distributed manner. Data node information corresponding to the data block 1b is "a DN 1-2 and a DN 2-2", that is, the data block 1b has two replicas, and the two replicas are stored on the DataNode DN 1-2 in the DC 1 and the DataNode DN 2-2 in the DC 2 in a distributed manner. Data node information corresponding to the data block 1c is "a DN 1-3 and a DN 2-3", that is, the data block 1c has two replicas, and the two replicas are stored on the DataNode DN 1-3 in the DC 1 and the DataNode DN 2-3 in the DC 2 in a distributed manner.

A block list of the target file 2 includes a data block 2a and a data block 2b. Data node information corresponding to the data block 2a is "a DN 2-4 and a DN 3-1", that is, the data block 2a has two replicas, and the two replicas are stored on the DataNode DN 2-4 in DC 2 and the DataNode DN 3-1 in the DC 3 in a distributed manner. Data node information corresponding to the data block 2b is "a DN 2-5 and a DN 3-2", that is, the data block 2b has two replicas, and the two replicas are stored on the DataNode DN 2-5 in the DC 2 and the DataNode DN 3-2 in the DC 3 in a distributed manner.

Figure 9:
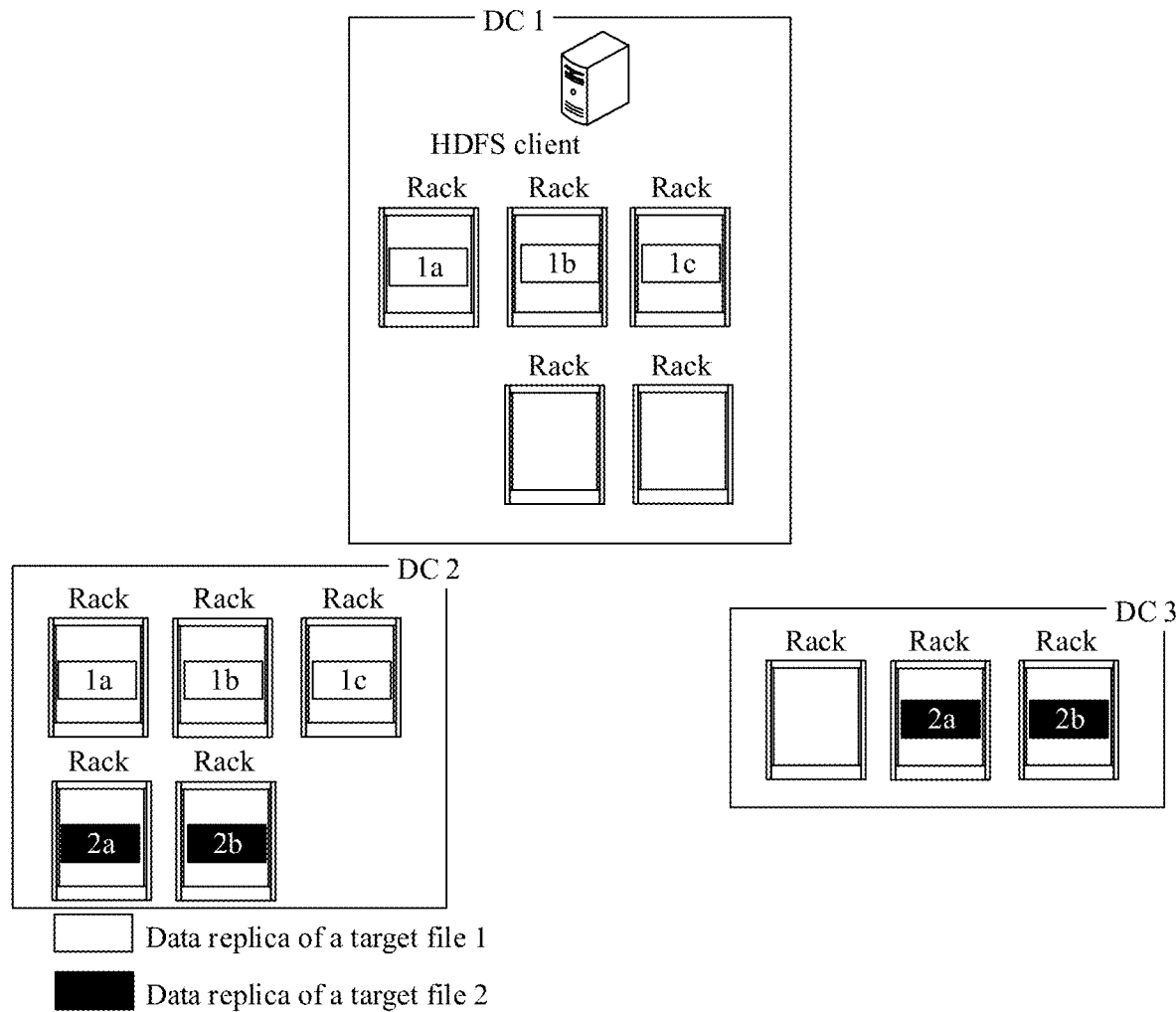
FIG. 9 is a schematic diagram of replica distribution according to an embodiment of this application.

FIG. 9 shows actual distribution of replicas of the target file 1 and the target file 2. The DC 1 stores replicas of the data block 1a, the data block 1b, and the data block 1c, and the DC 2 stores replicas of the data block 1a, the data block 1b, and the data block 1c. In other words, data centers in which the replicas of the target file 1 are stored include the DC 1 and the DC 2, that is, the data centers in which the replicas of the target file 1 are actually distributed are the DC 1 and the DC 2.

The DC 2 stores replicas of the data block 2a and the data block 2b, and the DC 3 stores replicas of the data block 2a and the data block 2b. In other words, data centers in which the replicas of the target file 2 are stored include the DC 2 and the DC 3, that is, the data centers in which the replicas of the target file 2 are actually distributed are the DC 2 and the DC 3.

In conclusion, data centers corresponding to the plurality of files that the client requests to access are the DC 1, the DC 2, and the DC 3, that is, the plurality of data centers that store the replicas of the target data are the DC 1, the DC 2, and the DC 3.

Step 803: The resource management server determines a first data center with the highest data locality in the plurality of data centers.

Specifically, the replicas of the target data can be accessed in all the plurality of data centers, but not all data of the target data can be accessed in a data center. Assuming that a replica accessed in a data center is closest to the target data, that is, data locality in the data center is the highest, the data center is the first data center described in this embodiment of this application.

In a possible implementation, block placement policies corresponding to the plurality of files requested by the client are inconsistent, that is, the replicas of the plurality of files are actually distributed in different DCs. Data locality in different DCs is different, and a DC with the highest degree of data locality is selected as the first data center described in this embodiment of this application.

For example, refer to FIG. 9. The target file 1 includes the data block 1a, the data block 1b, and the data block 1c. A replica of the data block 1a, a replica of the data block 1b, and a replica of the data block 1c may be accessed in the DC 1, and the replica of the data block 1a, the replica of the data block 1b, and the replica of the data block 1c may be accessed in the DC 2.

The target file 2 includes the data block 2a and the data block 2b. A replica of the data block 2a and a replica of the data block 2b may be accessed in the DC 1, and the replica of the data block 2a and the replica of the data block 2b may be accessed in the DC 2. In conclusion, replicas accessed in the DC 2 are closest to the request of the client, that is, all data of the target file 1 and the target file 2 can be accessed in the DC 2. Therefore, the DC 2 is the data center with the highest data locality in the DC 1, the DC 2, and the DC 3, and the DC 2 is the first data center described in this embodiment of this application.

In a possible implementation, the plurality of files requested by the client are from a same directory, and the block placement policies corresponding to the plurality of files are consistent, that is, replicas of the target file are actually distributed in a same DC. Degrees of data locality in different DCs are the same, and any DC may be selected as the first data center described in this embodiment of this application.

Figure 10:
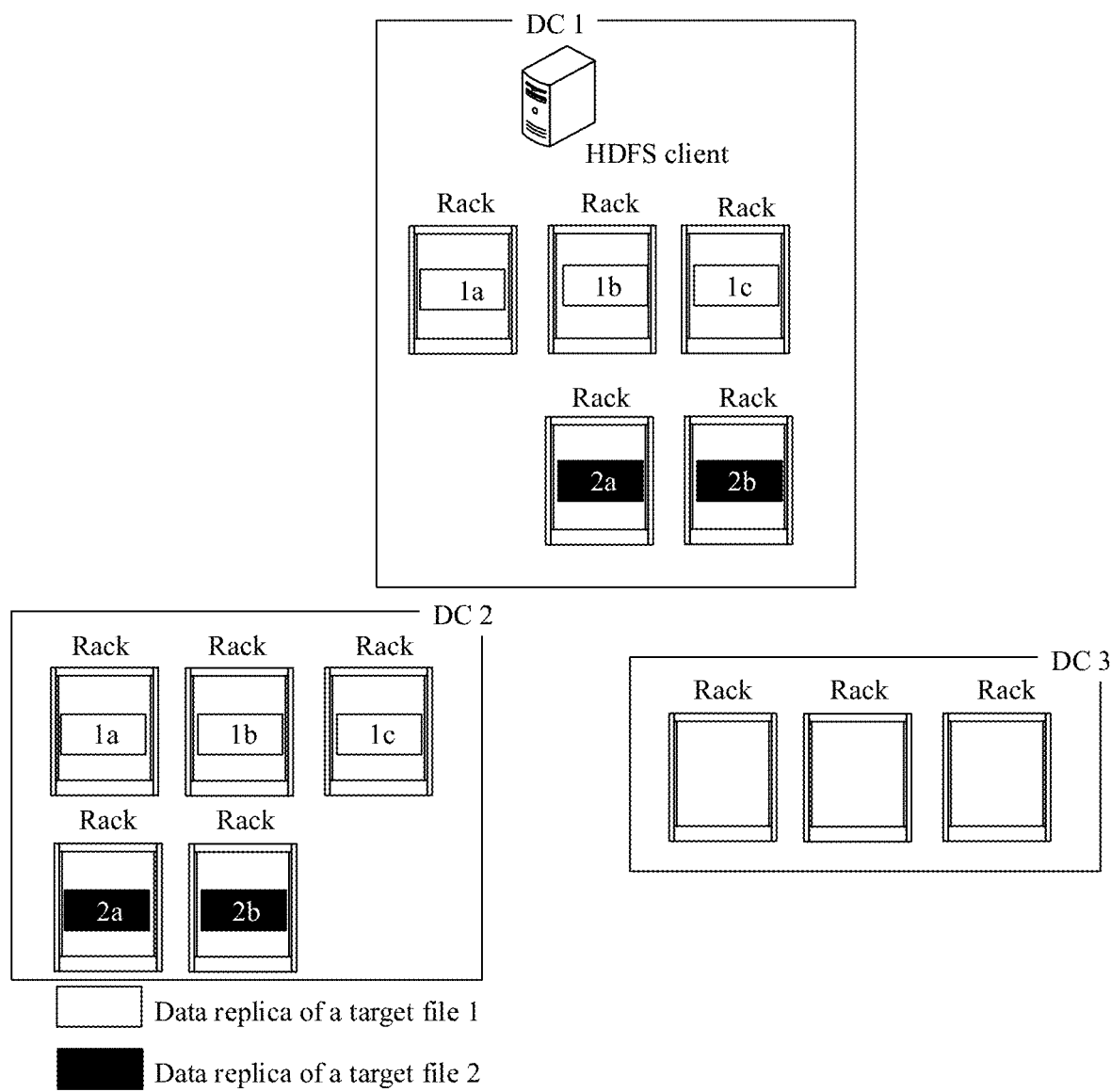
FIG. 10 is another schematic diagram of replica distribution according to an embodiment of this application.

For example, the target files that the client requests to access are the target file 1 and the target file 2. The target file 1 includes the data block 1a, the data block 1b, and the data block 1c, and the block placement policy corresponding to the target file 1 is as follows: the replicas are placed in the DC 1 and the DC 2. Refer to FIG. 10. The DC 1 stores the replicas of the data block 1a, the data block 1b, and the data block 1c, and the DC 2 stores the replicas of the data block 1a, the data block 1b, and the data block 1c. In other words, data centers in which the replicas of the target file 1 are stored include the DC 1 and the DC 2, that is, the data centers in which the replicas of the target file 1 are actually distributed are the DC 1 and the DC 2.

The target file 2 includes the data block 2a and the data block 1b. The block placement policy corresponding to the target file 2 is the same as the block placement policy corresponding to the target file 1, that is, the replicas are placed in the DC 1 and the DC 2. Refer to FIG. 10. The DC 1 stores the replicas of the data block 2a and the data block 2b, and the DC 2 stores the replicas of the data block 2a and the data block 2b. In other words, data centers in which the replicas of the target file 2 are stored include the DC 1 and the DC 2, that is, the data centers in which the replicas of the target file 2 are actually distributed are the DC 1 and the DC 2.

In conclusion, data centers corresponding to the plurality of files that the client requests to access are the DC 1 and the DC 2. All data of the target file 1 and the target file 2 can be accessed in both the DC 1 and the DC 2, and degrees of data locality in the DC 1 and the DC 2 are the same. The DC 1 or the DC 2 is the first data center described in this embodiment of this application.

Step 804: The resource management server sends, to the client, the replica of the target data read from the first data center.

Figure 11:
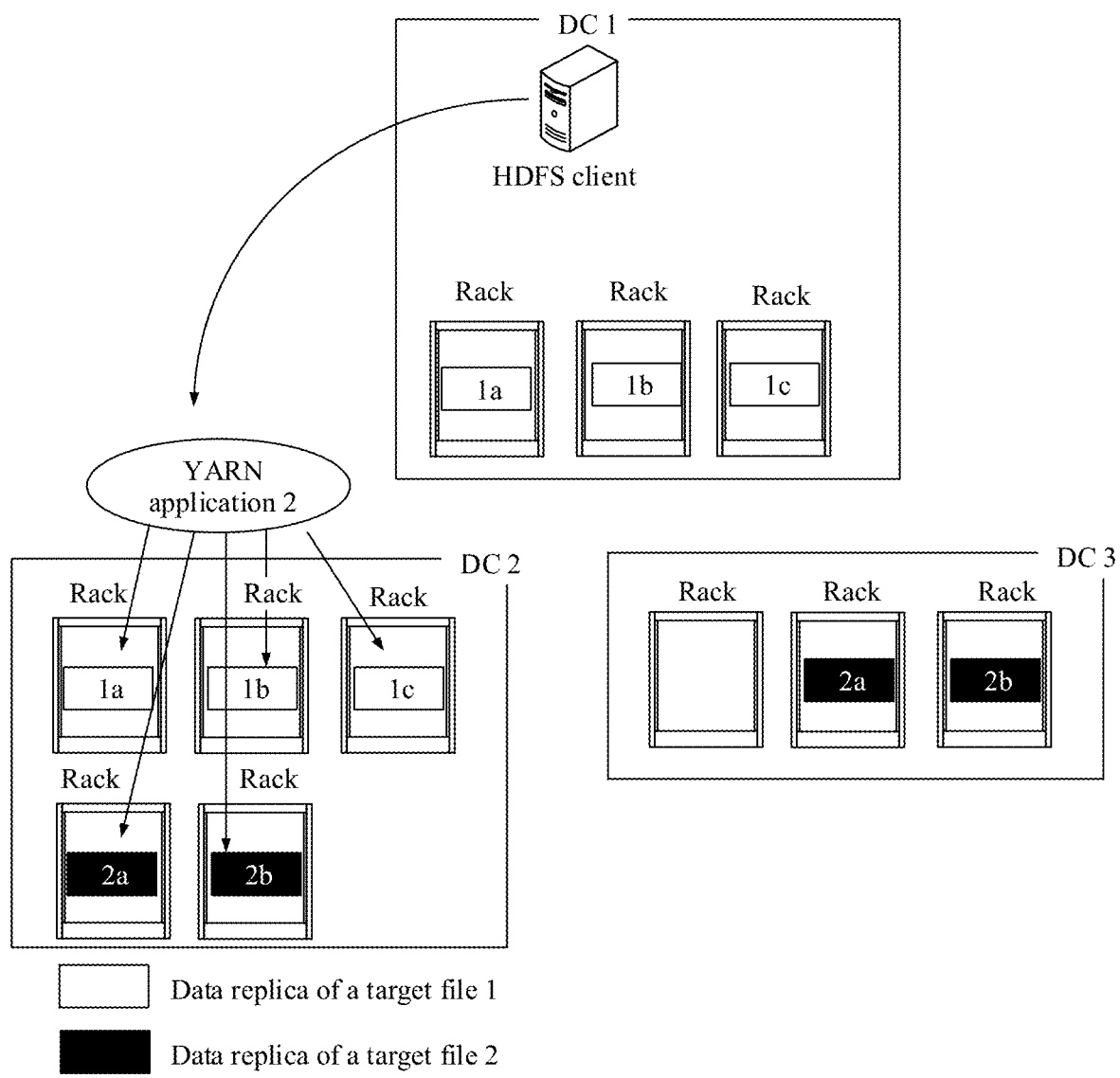
FIG. 11 is a schematic diagram of application allocation according to an embodiment of this application.

Specifically, the resource management server submits the data read request to a YARN resource in a DC with the highest locality (that is, the first data center described in this embodiment of this application) for running. In other words, the resource management server allocates a YARN application to execute the data read request of the client in the DC. For example, refer to FIG. 11. Because the DC 2 has the highest data locality, the resource management server allocates a YARN application 2 to access, in the DC 2, the replica of the data block 1a, the replica of the data block 1b, the replica of the data block 1c, the replica of the data block 2a, and the replica of the data block 2b, and returns the accessed replicas to the client.

It should be noted that a process management service sends the replicas of the target data, for example, replicas of all data blocks of the target file 1 and the target file 2, read in the first data center to the client.

Alternatively, if the process management service does not access all replicas of the target data in the first data center, the process management service may return the replica of the target data accessed from the first data center to the client, and the client may further access another replica of the target data in another DC. For example, the plurality of files requested by the client include a data block 1, a data block 2, and a data block 3. A replica of the data block 1 and a replica of the data block 3 may be accessed in the DC 1 with the highest data locality, and a replica of the data block 2 is accessed in the DC 3.

Step 805: When the first data center is faulty, the resource management server reads the replica of the target data in a second data center, and sends, to the client, the replica of the target data read from the second data center.

The second data center is a data center with the highest data locality except the first data center in the plurality of data centers that store the replicas of the target file. When the first data center is faulty, the data read request of the client is delivered to a YARN resource of the second data center for running, that is, the resource management server allocates a YARN application to execute the data read request of the client in the second data center. This can ensure that the data read request of the client is responded, and because data locality in the second data center is relatively high, most replicas of the target data can be accessed locally in the second data center, thereby reducing cross-DC data access as much as possible, and reducing bandwidth consumption.

Figure 12:
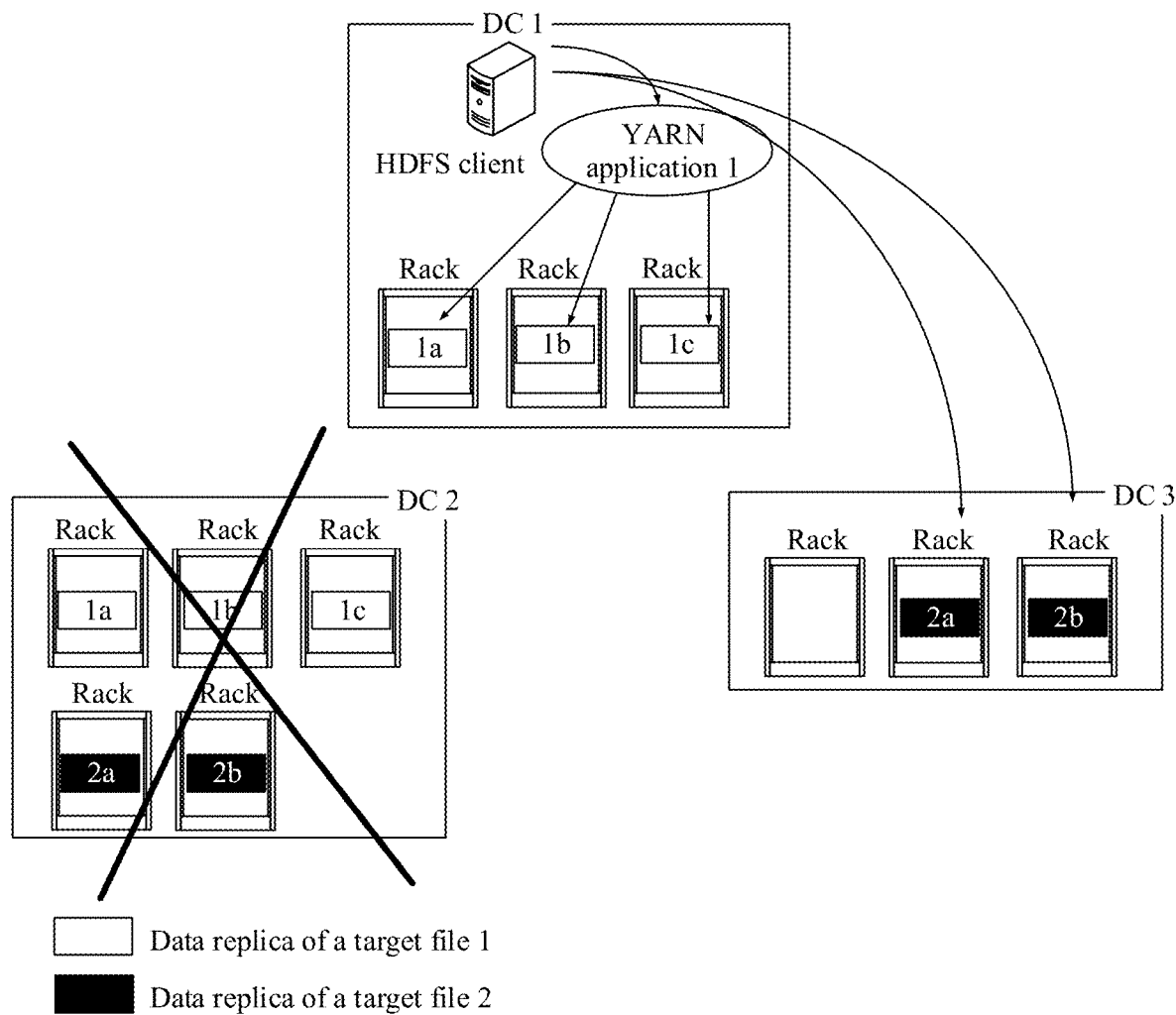
FIG. 12 is another schematic diagram of application allocation according to an embodiment of this application.

For example, refer to FIG. 12. The DC 2 is the data center with the highest data locality. When the DC 2 is faulty, the replica of the data block 1a, the replica of the data block 1b, and the replica of the data block 1c may be accessed in the DC 1, and the replica of the data block 2a and the replica of the data block 2b may be accessed in the DC 3.

The client requests to access the target file 1 and the target file 2, and the target file 1 and the target file 2 include the data block 1a, the data block 1b, the data block 1c, the data block 2a, and the data block 2b. Compared with the replicas accessed in the DC 3, the replicas accessed in the DC 1 are closer to the data requested by the client. Therefore, a degree of data locality in the DC 1 is higher than that in the DC 3, that is, the DC 1 is the second data center described in this embodiment of this application.

For details, refer to FIG. 12. The resource management server may allocate a YARN application 1 to access, in the DC 1, the replica of the data block 1a, the replica of the data block 1b, and the replica of the data block 1c, and return the accessed replicas to the client. In addition, the client may further access the replica of the data block 1 across DCs, for example, occupy communication bandwidth between the DC 1 and the DC 3 to access the replicas of the data block 2a and the data block 2b in the DC 3.

Optionally, the method shown in FIG. 8 in this embodiment of this application may be implemented by using a plug-in DC Scheduler in the YARN ResourceManager, or certainly may be implemented by using another function module in the YARN ResourceManager. This is not limited in this embodiment of this application.

In the method provided in this embodiment of this application, replicas of a file are placed across DCs, and are not limited to a same DC. After a single DC is faulty, all data of the file may not be lost. In addition, the client may further access the replica of the file in another DC, to ensure, as much as possible, that client services are not affected by DC breakdown and the data read request of the client can be responded in time. In addition, the data read request of the client is always scheduled to the DC with the highest data locality. That is, most data of the target file can be accessed in a same DC as much as possible. This prevents communication bandwidth between DCs from being excessively occupied to access data across DCs, affecting system performance.

Figure 13:
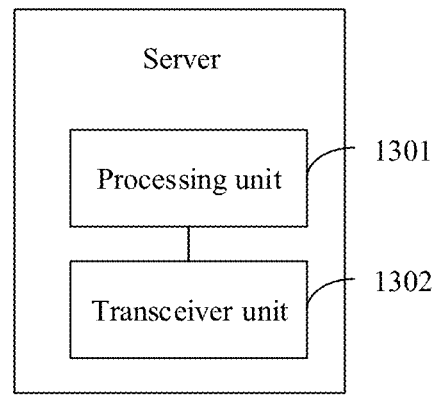
FIG. 13 is a block diagram of another structure of a server according to an embodiment of this application.

When function modules are obtained through division based on corresponding functions, FIG. 13 is a schematic diagram of a possible structure of the server in the foregoing embodiments. The server shown in FIG. 13 may be the resource management server or the name management server described in the embodiments of this application, or may be a component in the resource management server or the name management server that implements the foregoing method. As shown in FIG. 13, the server includes a processing unit 1301 and a transceiver unit 1302. The processing unit may be one or more processors, and the transceiver unit 1302 may be a network interface.

The processing unit 1301 is configured to support the resource management server in performing step 802 and step 803, and support the name management server in performing step 402, and/or is configured to perform another process of the technology described in this specification.

The transceiver unit 1302 is configured to support, for example, the resource management server in performing step 801, step 801, and step 805, and support the name management server in performing step 401, and/or is configured to perform another process of the technology described in this specification.

In a possible implementation, the server shown in FIG. 13 may alternatively be a chip applied to the resource management server or the name management server. The chip may be a system-on-a-Chip (SOC).

The transceiver unit 1302 configured to perform receiving/sending may be a network interface of the server, and is configured to receive a signal from another server.

Figure 14:
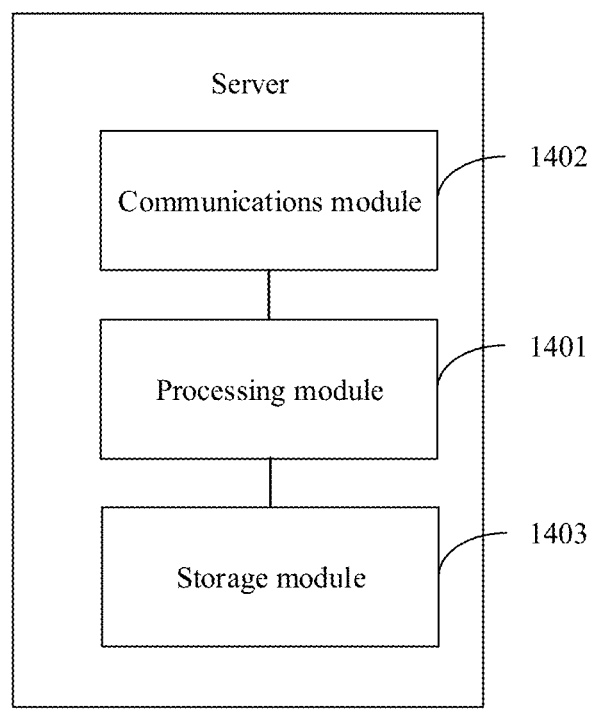
FIG. 14 is a block diagram of another structure of a server according to an embodiment of this application.

For example, when an integrated unit is used, a schematic diagram of a structure of a server according to an embodiment of this application is shown in FIG. 14. In FIG. 14, the server includes a processing module 1401 and a communications module 1402. The processing module 1401 is configured to control and manage actions of the server, for example, perform the steps performed by the foregoing processing unit 1301, and/or is configured to perform another process of the technology described in this specification. The communications module 1402 is configured to perform the steps performed by the transceiver unit 1302, and support interaction between the server and another device, for example, interaction with another terminal server. As shown in FIG. 14, the server may further include a storage module 1403, and the storage module 1403 is configured to store program code and data of the server.

When the processing module 1401 is a processor, the communications module 1402 is a network interface, and the storage module 1403 is a memory, the server is the server shown in FIG. 3.

This application provides a computer-readable storage medium. The computer-readable storage medium stores computer instructions. The computer instructions instruct a resource management server to perform the foregoing data read method, or the computer instructions are used to implement function units included in the resource management server.

This application provides a computer-readable storage medium. The computer-readable storage medium stores computer instructions. The computer instructions instruct a name management server to perform the foregoing data write method, or the computer instructions are used to implement function units included in the name management server.

This application provides a computer program product. The computer program product includes computer instructions. The computer instructions instruct a resource management server to perform the foregoing data read method, or the computer instructions are used to implement function units included in the resource management server.

This application provides a computer program product. The computer program product includes computer instructions. The computer instructions instruct a name management server to perform the foregoing data write method, or the computer instructions are used to implement function units included in the name management server.

The foregoing descriptions about implementations allow a person skilled in the art to clearly understand that, for the purpose of convenient and brief description, division of the foregoing function modules is used as an example for illustration. In actual application, the foregoing functions can be allocated to different function modules and implemented based on a requirement, that is, an inner structure of a database access apparatus is divided into different function modules to implement all or some of the functions described above.

In the several embodiments provided in this application, it should be understood that the disclosed database access apparatus and method may be implemented in other manners. For example, the described database access apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electronic, mechanical, or other forms.

The units described as separate parts may or may not be physically separate, and parts displayed as units may be one or more physical units, may be located in one place, or may be distributed at different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes various media that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data read method, comprising:
receiving a data read request from a client, wherein the data read request is used to request a target data, the target data comprises data in a plurality of files, the data read request carries directory information of the target data, and the directory information of the target data indicates access paths of the plurality of files;

determining a plurality of data centers that store replicas of the target data based on the directory information;
selecting a first data center among the plurality of data centers, wherein the first data center is a data center with a data locality that is the highest among the plurality of data centers, the data locality of each data center indicates a degree of similarity between the target data and a replica of the target data stored on each data center, the degree of similarity between the target data and the replica of the target data stored on each data center being measured by a quantity of data blocks shared between the target data and the replica of the target data, and the first data center having the highest data locality is selected to reduce traffic across data centers;
reading, by a resource management server, a replica of the target data from the first data center; and
sending the replica of the target data read from the first data center.

2. The method according to claim 1, wherein the method further comprises:
when the first data center is faulty, reading, by the resource management server, a replica of the target data from a second data center, wherein the second data center is a data center with a data locality that is the highest in the plurality of data centers except the first data center; and
sending the replica of the target data read from the second data center.

3. The method according to claim 1, wherein the first data center is a data center in which the client is located.

4. A resource management server, wherein the resource management server comprises a processor and a memory, and when the processor executes computer instructions in the memory, the resource management server is configured to:
receive a data read request from a client, wherein the data read request is used to request a target data, the target data comprises data in a plurality of files, the data read request carries directory information of the plurality of files, and the directory information indicates access paths of the plurality of files;
determine a plurality of data centers that store replicas of the target data based on the directory information;
selecting a first data center among the plurality of data centers, wherein the first data center is a data center with a data locality that is the highest among the plurality of data centers, the data locality indicates a degree of similarity between the target data and a replica of the target data stored on each data center, the degree of similarity between the target data and the replica of the target data stored on each data center being measured by a quantity of data blocks shared between the target data and the replica of the target data, and the first data center having the highest data locality is selected to reduce traffic across data centers;
read a replica of the target data from the first data center; and
send to the client the replica of the target data read from the first data center.

5. The resource management server according to claim 4, wherein the resource management server is configured to:
when the first data center is faulty, read a replica of the target data from a second data center, wherein the second data center is a data center with the highest data locality in the plurality of data centers except the first data center; and
send, to the client, the replica of the target data read from the second data center.

6. The resource management server according to claim 4, wherein the first data center is a data center in which the client is located.

* * * * *